July 11, 1961 C. A. HEUER ET AL 2,991,543
CONNECTION
Original Filed Oct. 22, 1954 2 Sheets-Sheet 1

INVENTORS
CHARLES A. HEUER
RICHARD F. ADAMS
BY
ATTORNEYS

July 11, 1961 C. A. HEUER ET AL 2,991,543
CONNECTION
Original Filed Oct. 22, 1954 2 Sheets-Sheet 2
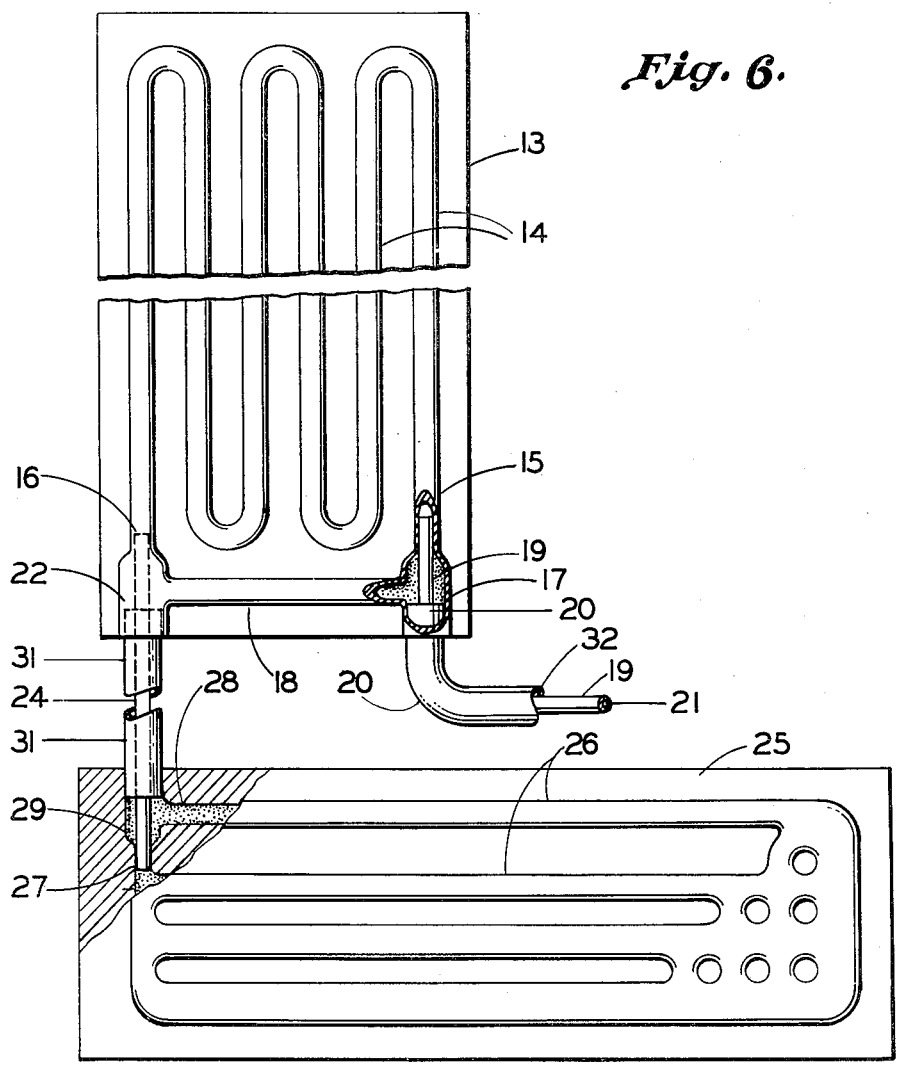
Fig. 6.
Fig. 7.
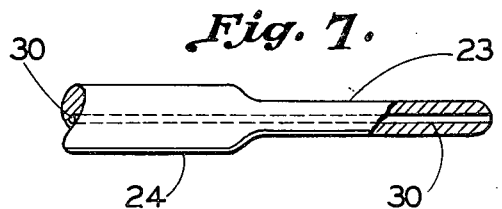
INVENTORS
CHARLES A. HEUER
RICHARD F. ADAMS
BY
ATTORNEYS United States Patent Office 2,991,543
Patented July 11, 1961

2,991,543
CONNECTION
Charles A. Heuer and Richard F. Adams, Alton, Ill., assignors to Olin Mathieson Chemical Corporation, East Alton, Ill., a corporation of Virginia
Original application Oct. 22, 1954, Ser. No. 463,988, now Patent No. 2,822,151, dated Feb. 4, 1958. Divided and this application May 15, 1957, Ser. No. 661,560
6 Claims. (Cl. 29—157.3)

This invention relates to a sheet material tube structure and more specifically to a tube connection for a sheet metal article having a series of conduit tubes included therein for conveying fluids through the article.

This application is a divisional of co-pending application Serial No. 463,988, filed October 22, 1954, now Patent No. 2,822,151.

In the formation of hollow articles such as heat exchangers or the like it is advantageous in many instances to fabricate the article from a pair of sheet metal components joined together in face-to-face relationship except at spaced apart portions forming corrugations or bulges of a suitable configuration following a serpentine, grid, or looped path, for example, and various combinations thereof. The embossed sheet metal components may be stuck together by means of an interleaved soldering and brazing material as has been heretofore customary after the component sheets have been embossed with a desired tube corrugation. The hollow article may be also formed by a method such as that disclosed in U.S. Patent No. 2,690,002 which results in a single flat sheet having potential passageways defined by a thin stratum of separation material embraced within the body of the single sheet and into which and along which fluid inflation pressure may be admitted thereby distending the sheet to form the passageways of a hollow article. In order that the article may be put to use and otherwise subject to processing such as inflation or cleaning of the interior, it stands to reason that such sheet material articles must be provided with some form of inlet and outlet to enable flow of the fluid medium through the passageways. This often necessitates the provision of two or more extensions of the passageways to the periphery of the sheet in order that circulatory communication may be had with the interior of the hollow article. A multiplicity of such connections is disadvantageous because it requires a separate assembly operation for each, a complex and more expensive tube forming and connecting die, or necessitates the extra operation of plugging up certain of the connections during certain phases of fabrication and opening of the connections after the conclusion of these operations. On the other hand when only one connection is provided as is often the case in the inflation method of forming of hollow articles, there is the disadvantage of the necessity of making a second connection by some suitable additional operation such as perforating or the like.

Therefore, an object of this invention is to provide in a sheet-like hollow article a form of single connection passageway adapted for the making of both an inlet and an outlet for the circulatory fluid to be carried in the hollow article. Another object of this invention is to provide a hollow article of sheet material in which connection to the fluid medium circulatory system may be readily made at but one place. Another object is to provide a connection for a sheet metal article adapted to facilitate the circulation of a fluid therein as well as the formation of a fluid conduit therein by inflation. Another object is to provide a combined inlet and outlet connection in a hollow article wherein both the article and the connection are formed by a pressure welding or roll bonding process including interleaved weld preventing material. Other objects and advantages will be apparent from the following description of specific embodiments of the invention and the accompanying drawing of the same in which:

FIGURE 6 is a plan view of a second embodiment of this invention with a portion broken away in the sheet metal article to better illustrate the structure and showing various couplings obtainable by means of this invention; and FIGURE 7 is a fragmentary side view partly in cross section showing a device suitable for forming the hollow articles illustrated in the foregoing figures by inflation.

Figure 1:
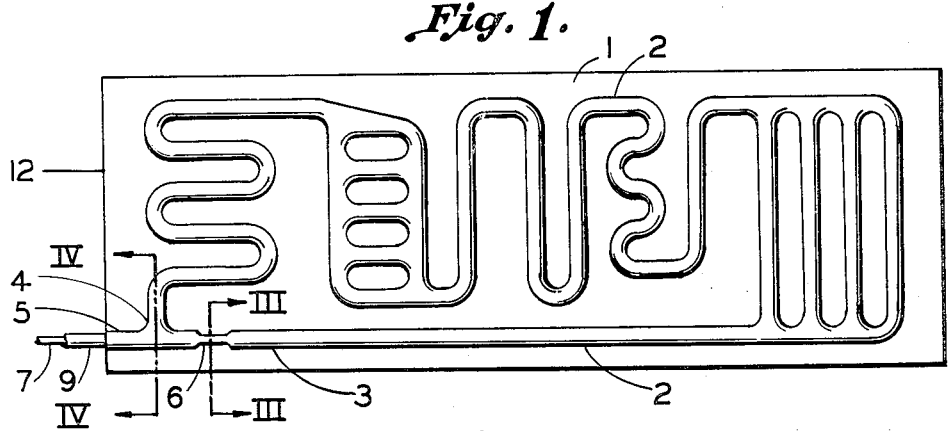
FIGURE 1 is a plan view of one embodiment of a sheet metal article in accordance with this invention.

In accordance with this invention there is provided a single combined inlet-outlet form of connection to the passageways of a fluid circuit. The connection is disposed between the conduit system of a hollow article and only one part of the periphery of the article adapting the hollow article to make communication with a fluid circuit exterior to it by means of an injection nozzle or a coaxial spaced tubular construction, or the like. Accordingly a terminal portion of the passageways of the conduit system of a sheet-like hollow article is extended to a peripheral edge of the article in such a manner as to provide in seriatum adjacent passageway portions different in size and arranged so that the larger portion is disposed between the periphery and the lesser portion and includes a lateral junction such as a T or Y junction or the like with another portion of the passageways. The lesser portion relative to the larger forms the convergent part of the passageway and/or the extension thereof to the periphery while the larger portion relative to the convergent portion constitutes the extension which in a sense may be considered a divergent continuation of the passageway and/or its convergent part to the periphery or edge of the article. According to one construction, one of the terminal portions of the fluid passageways of the conduit system of the hollow sheet metal article is provided with an enlarged extension to the periphery of the article while the other terminal portion of the passageways is caused to make a T-junction with the enlarged portion. This permits the insertion of a hollow needle or injection nozzle at the periphery of the article through and beyond the extension to extend into the unenlarged first terminal portion of the passageways in sealing relationship with one part of this terminal portion thereby forming one part of the connection such as the inlet and leaving a space about the body of the needle or nozzle. By connection is meant the means for making fluid coupling both to and from the fluid circuit of the hollow article. At and through this space a second and coaxial part of the connection with the periphery of the article may be made to serve as an outlet for the circulatory fluid. The connection includes an arrangement of two tubes, one substantially coaxially within and spaced from the other. An alternate construction is to provide a constriction adjacent the first terminal portion of the fluid passageways, from which constriction an unrestricted extension is made to the periphery of the sheet article and to provide a T- junction between the other terminal portion of the conduit system passageways at such extension at a point between the constriction and the periphery. It is preferred that in further accordance with this invention the inlet-outlet passageway construction including the extension and the T-junction with either the enlargement or the constriction be delineated in the single sheet articles, formed by roll pressure welding referred to hereinbefore, by the configuration of the thin stratum of separation material enveloped within the body of the single sheet of the article.

In articles formed by this method, the extension is a continuation of and defined by the separation or stopweld material which is sandwiched between the component sheets which go to make up the finished single sheet article, after the to-be-juxtaposed surfaces of these component sheets have been treated to substantially remove foreign material which would interfere with weldability. The divergency and adjacent constriction, which are characteristic features of this invention, are provided in the pattern of separation material at the extension. Thereafter in accordance with the method of forming articles by fluid pressure inflation a fluid pressure inflation nozzle is inserted at the extension to develop the conduit passageways in the article and subsequent steps of manufacture such as cleaning and connection with other hollow units and a fluid pump or compressor are conducted as is herein described.

The inlet-outlet extension structure of this invention is advantageously formed in accordance with this invention by being preformed in the stratum of separation material which is enveloped within the sheet-like article. The article itself is formed in accordance with the method whereby a passageway pattern composed of the separation material is applied between the juxtaposed surfaces of component sheets at least two of which go to make up the article. The pattern is designed so as to include an extension of the separation material pattern preformed with a constriction or with an enlargement as herein described. Where the component sheets are metal and joined by rolling, the pattern of separation material is foreshortened suitably so that upon extension concomitant to the rolling process a passageway pattern, including the extension structure, results with predetermined configuration.

The invention can be more clearly understood from a description of the specific embodiments illustrated in the accompanying drawing.

Figure 2:
FIGURE 2 is an elevational view of the edge of the embodiment of FIGURE 1.

In the one embodiment shown in FIGURES 1, 2, 3, 4 and 5, the hollow article is made up of a single sheet 1 is formed from initially distinct component sheets by a pressure welding process characterized by the presence of an included pattern of separation material along which fluid inflation pressure has been released after welding so as to develop the conduit system passageways 2 extending from the surface of the sheet as shown in FIGURE 1 and FIGURE 2. To make such a sheet, the to-be-juxtaposed surfaces of component sheets are first treated so as to clean them for the purpose of removing foreign matter sufficiently to render the surfaces weldable, after which the component sheets are placed in superposition with a suitable pattern of separation material between the adjacent components and the assembly is subjected to a reduction to unify the components except in the areas occupied by the separation material. One terminal portion 3 of the passageways 2, which may be referred to as the inlet terminal portion, is provided with a constriction 6 from which inlet terminal portion 3 is continued in unrestricted condition to extend to one peripheral edge 12 of the sheet 1 thereby forming an extension 5. This terminal extension 5 forms a communicating passageway between conduit passageways 2 and the peripheral edge 12 of sheet 1. The other or outlet terminal portion 4 of the passageways 2 instead of being also extended to the periphery of sheet 1, is disposed to form a T-junction with the unrestricted extension 5. As indicated in detail in FIGURE 5, the extension 5, the constriction 6 and passageways 2 are delineated prior to inflation by the presence of a stratum of weld preventing or separation material 11 which is a composition of a carbonaceous or graphitic nature remaining as a residue, unless cleaned out.

In order to erect the passageways and extension structure shown generally in FIGURES 1 and 2, including the constriction 6, and to clean out the interior of the passageways fluid under pressure is first admitted into the interior of the sheet 1 along the stratum of separation material 11 and thereafter a cleaning fluid by means of a nozzle suitable for the purpose and constructed as shown in FIGURE 7. This fluid injection nozzle consists of an end portion 23 of lesser diameter and an adjacent portion 24 of larger diameter. A fluid pressure admitting bore 30 extends through both portions 23 and 24 of the nozzle. Erection of the passageways to the conduit system is accomplished by driving end portion 23 of the nozzle into the edge of the uninflated sheet 1 at the extension 5 until the tip of end portion 23 which is of a size adapted to the purpose, has made substantial entry into and beyond the constriction part 6 of the weld-preventing material 11 at which position the larger portion 24 of the nozzle has entered into extension 5 of the material 11. With the sheet material at extension 5 held in adequate sealing relationship with the larger part 24 of the needle, fluid pressure is admitted through bore 30 along the rest of the separation material 11 thereby erecting passageway by inflation. Next, with the nozzle withdrawn only sufficiently to disengage the larger portion 24 from the extension 5 to make a discharge opening, cleaning fluid is admitted by way of bore 30 and forced to enter into the passageway at section 3, through passageways 2, and issue from the discharge opening.

Subsequently a drying gas or other suitable surface treating fluid may be admitted through bore 30.

Figure 3:
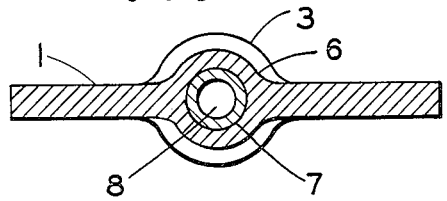
FIGURE 3 is a fragmentary cross sectional enlarged view taken on line III—III of FIGURE 1.
Figure 4:
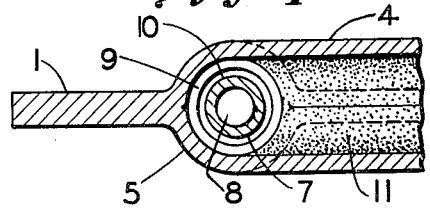
FIGURE 4 is a fragmentary cross sectional enlarged view taken on line IV—IV of FIGURE 1.
Figure 5:
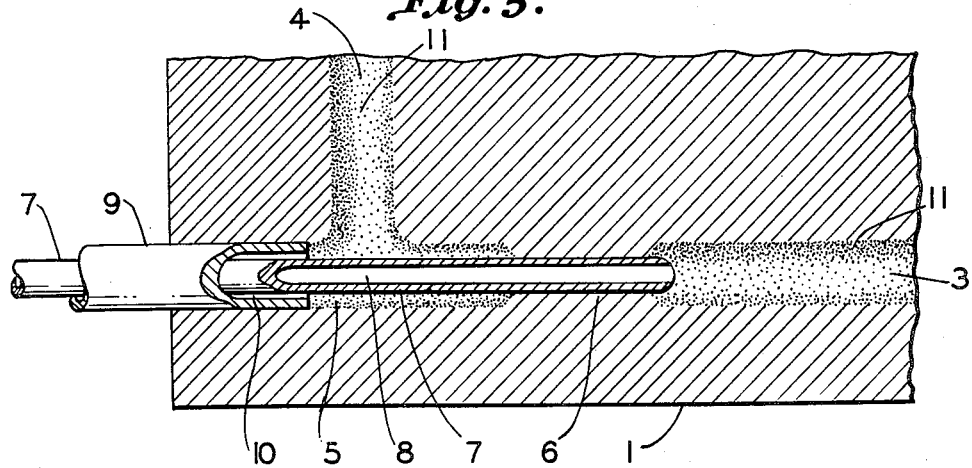
FIGURE 5 is a partial cross sectional enlarged view taken at the median plane of the sheet metal article of FIGURE 1 on line V—V at the combination inlet-outlet portion thereof.

Following inflation and internal cleaning of the sheet structure 1, the injection nozzle is withdrawn entirely and inlet-outlet connections are made as shown in FIGURES 1–5. An inlet tube 7 of minor exterior diameter suitable to the constriction 6 is inserted through the extension 5 into the constriction 6 where a seal is made with the end of inlet tube 7 as shown in FIGURES 3 and 5. An outlet tube 9 of major diameter is assembled coaxially about inlet tube 7 and is disposed so that the end of outlet tube 9 extends into extension 5 in sealing relationship. As shown in FIGURES 4 and 5 this leaves a coaxial space between the inside of outlet tube 9 and the exterior of inlet tube 7 thereby providing another connection 10 serving as an outlet. Thus the bore 8 of tube 7 provides an inlet connection to the first terminal portion 3 of the passageways 2 while coaxial space 10 between tubes 7 and 9 provides the outlet connection from the other terminal 4 of the passageways via extension 5.

In the embodiment of FIGURE 6, a sheet metal structure 13 is provided with a zig-zag pattern of conduit passageways 14 having a first or inlet terminal portion 15 and a second or outlet terminal portion 16. The inlet-outlet construction of this embodiment consists of an enlarged extension 17 of the first terminal portion 15 and a return conduit 18 making T-junction with extension 17 and extending between the second terminal portion 16 and the enlarged extension 17. The enlarged extension structure 17 of this embodiment is an alternative construction to the constricted structure of the previous embodiment and is desirable where a greater capacity of flow without reduction is needed to the inlet-outlet connection.

In the embodiment of FIGURE 6 primary sheet structure 13 is provided with a second inlet-outlet connection in the form of an enlargement and extension 22 extending between outlet terminal 16 of passageways 14, and a peripheral portion of the sheet 13. At this second extension 22 a combined inlet-outlet connection is completed by the addition of an inner tube 24 and an outer tube 31 which constitutes a dual coupling between primary hollow sheet structure 13 and the secondary hollow sheet structure 25 which also embraces a series of passageways 26. In the secondary sheet 25 passageways 26 have an inlet terminal 27 and an outlet terminal 28 at which junction is made with the enlarged extension 29 the form of which is similar to the hereinbefore described extensions 17 and 22. At extension 29 a combined inlet-outlet connection is made by insertion of and joining with the spaced coaxial tubes 24 and 31.

Inflation of the sheet structures 13 and 25 having the connections of this embodiment may be accomplished with the aid of the inflation nozzle of FIGURE 7 as in the previous embodiment.

After inflation and removal of the inflation nozzle, an inlet tube 19 of minor diameter having an inlet passage 21 is disposed in and through the enlarged extension 17 until the end of inlet tube 19 is positioned in terminal portion 15 of the passageways 14 where a suitable seal may be formed and an outlet tube 20 is coaxially assembled about inlet tube 19 in spaced relationship therewith and extended to make a sealing connection with the outer end of the enlarged extension 17. This form of construction leaves a coaxial space 32 through which fluid issuing from terminal portion 28 through return 18, its T-junction and extension 17 may be ejected. In like manner inner tube 24 is coupled at one end at enlargement 22 to outlet terminal 16 of passageways 14 while the other end of tube 24 is coupled at enlargement 29 to inlet terminal 27 of passageways 26 of the secondary hollow sheet structure 25. The entire assembly of FIGURE 6 permits fluid such as a refrigerant to be admitted at inlet terminal 15 by way of tube 19, circulate through passageways 14 of sheet 13 to outlet terminal 16 from whence the fluid is transferred by way of tube 24 to the inlet terminal 27 of secondary sheet 25, to circulate from terminal 27 through passageways 26 to outlet terminal 28 from which the fluid leaves the secondary sheet by way of extension 29 and the outer coaxial tube 31 and reenters sheet 13 at 22, to be bypassed through the return or cross passageway 18 to extension 17 from which the fluid is discharged by way of the outer coaxial tube 20. It will be appreciated that by means of this structure only 3 connections with the use of convention tubing are required instead of six.

It is obvious that by means of this invention there is provided a single connection at which both an inlet and an outlet is accomplished without the necessity of auxiliary parts such as perforated plugs or the use of special flanged tubing or the like. With the connection of this invention conventional tubing and couplings may be employed. Furthermore, while connection has been shown only for a single sheet and a two sheet arrangement it will be appreciated that three or more sheets may be advantageously coupled by means of the new and improved connection herein described. For instance it will be readily understood that where the conduit passageway 14 makes a bend adjacent the periphery, and particularly at the corners of the article, more than one secondary sheet may be connected directly to the primary sheet of FIGURE 6 and that tertiary sheets may be connected in series with the secondary sheets. It will also be appreciated that this invention has utility for variously formed hollow articles containing fluid passageways but especially with respect to sheet-like articles the conduit system of which is generable by means of fluid inflation.

Since many other embodiments of this invention may occur to those skilled in the art, it is to be understood that the foregoing is intended by way of illustration of a preferred embodiment and not as a limitation of the scope of the present invention except as set forth in the appended claims.

What is claimed is:

1. The method of making a sheet-like hollow article having passageways enveloped in the unitary body of the article comprising the steps of providing superposed component sheets, treating the to-be-juxtaposed surfaces of at least a pair of such component sheets to substantially remove foreign matter therefrom, applying a stratum of separation material in the form of a passageway pattern upon the treated surface of one of said sheets, said pattern including an extension to the periphery of said sheet and making spaced junctions with the inlet portion and the outlet portion of said passageway pattern with said pattern being applied so that portion of said extension in said space between said junctions includes a constricted portion adjacent the inlet portion of the passageways and an enlarged portion relative to said constricted portion adjacent said outlet portion of said passageways, said enlarged portion extending to the periphery of the sheet, juxtaposing said pair of component sheets in fixed superposed relationship with said pattern of separation material sandwiched therebetween, joining said component sheets except at said separation material to produce a unitary sheet the stratum of separation material of which is adapted to the formation of a passageway within the body of the article upon application of fluid pressure along the pattern of separation material, injecting fluid under sufficient pressure at said extension for distending said sheet in the area of said separation material to form the passageways, and injecting a stream of cleaning fluid into the interior of said distended portion at said constricted portion, said cleaning fluid being under sufficient pressure to cause it to flow throughout the passageways and discharge therefrom at said extension.

2. The method of making a sheet-like hollow article having passageways enveloped in the unitary body of the article comprising the steps of providing a pair of superposed component sheets, treating the to-be-juxtaposed surfaces of the component sheets to substantially remove foreign matter therefrom, applying a stratum of separation material in the form of a passageway pattern upon the treated surface of one of said sheets, said pattern including an extension to the periphery of said sheet and making spaced junction with the inlet terminal portion and the outlet terminal portion of said passageway pattern, said space between said junctions including a constricted portion adjacent one end of said terminal portions of the passageways and an enlarged portion adjacent the other terminal portion of said passageways, said enlarged portion extending to the periphery of the sheet, juxtaposing said component sheets with said pattern of separation material sandwiched therebetween, joining said component sheets except at said separation material to produce a unitary sheet the stratum of separation material of which is adapted to the formation of a passageway within the body of the article upon application of fluid pressure along the pattern of separation material, injecting fluid under sufficient pressure at said extension for distending said sheet in the area of said separation material to form the passageways, and injecting a stream of surface treating fluid into the interior of said distended portion at and through said constricted portion for flow throughout the passageways and discharge therefrom at said extension, and injecting a stream of drying fluid into the interior of said distended portion at and through said constriction for flow throughout the passageways and discharge therefrom at said extension, both surface treating fluid and said drying fluid being under sufficient pressure to cause their said flow.

3. The method of making a sheet-like hollow article having passageways enveloped in the unitary body of the article comprising the steps of providing suporposed component sheets, treating the to-be-juxtaposed surfaces of a pair of such component sheets to substantially remove foreign matter therefrom, applying a stratum of separation material in the form of a passageway pattern upon the treated surface of one of said sheets, said pattern including an extension to the periphery of said sheet and making spaced junction with the inlet terminal portion and the outlet terminal portion of said passageway pattern, said space between said junctions including a constricted portion adjacent one of said terminal portions of the passageways and an enlarged portion adjacent the other terminal portion of said passageways, said enlarged portion extending to the periphery of the sheet, juxtaposing said component sheets in fixed superposed relationship with said pattern of separation material sandwiched therebetween, joining said component sheets except at said separation material to produce a unitary sheet the stratum of separation material of which is adapted to the formation of a passageway within the body of the article upon application of fluid pressure along the pattern of separation material, inserting at said extension a hollow needle the front part of which is of external diameter adapted to make a tight fit at said constricted portion and another portion of which needle back of said front portion is enlarged and adapted to make a tight fit with the enlarged portion of said extension at the periphery of the sheet, injecting fluid under sufficient pressure at said extension through said needle for distending said sheet in the area of said separate material to form the passageways, withdrawing said needle only sufficiently to remove the enlarged portion of said needle from said extension without removing the front part of said needle out of said constricted portion, and injecting a stream of surface treating fluid through said needle into the interior of said distended portion at said constricted portion, said surface treating fluid being under sufficient pressure to cause it to flow throughout the passageways and discharge therefrom at said extension between the inner surface of said enlarged portion and the exterior of said needle.

4. The method of making a sheet-like hollow article having passageways enveloped in the unitary body of the article comprising the steps of providing superposed component sheets, treating the to-be-juxtaposed surfaces of a pair of such component sheets to substantially remove foreign matter therefrom, applying a stratum of separation material in the form of a passageway pattern upon the treated surface of one of said sheets, said pattern including an extension to the periphery of said sheet and making spaced junction with the inlet terminal portion and the outlet terminal portion of said passageway pattern, said space between said junctions including a constricted portion adjacent one of said terminal portions of the passageways and an enlarged portion adjacent the other terminal portion of said passageways, said enlarged portion extending to the periphery of the sheet, juxtaposing said component sheets in fixed superposed relationship with said pattern of separation material sandwiched therebetween, joining said component sheets except at said separation material to produce a unitary sheet the stratum of separation material of which is adapted to the formation of a passageway within the body of the article upon application of fluid pressure along the pattern of separation material, inserting at said extension a hollow needle the front part of which is adapted to make a tight fit at said constricted portion and the rear part of which is enlarged and adapted to fit tightly with the enlarged portion of the extension between the periphery and said other terminal portion, injecting a fluid under sufficient pressure through said needle for distending said sheet in the area of said separation material to form the passageways, withdrawing said needle sufficiently to separate said enlarged needle part from the intersurface of said enlarged portion of the extension and injecting a stream of surface treating fluid through said needle into the interior of said distended portion at said constricted portion said surface treating fluid being under sufficient pressure to cause it to flow throughout the passageways and discharge therefrom at said extension between the inner surface of said enlarged portion and the exterior of said needle.

5. As an article of manufacture, a blank comprising a sheet-like article including between the surfaces thereof a relatively thin stratum of separation material in the form of a pattern including interconnected inflatable embryonic passageways and an extension of said embryonic passageways to the periphery of the article, said extension having two spaced junctions with the terminal ends of said embryonic passageways, said space between said junctions in said extension including adjacent convergent and divergent portions, said convergent portion being directly joined in series with one terminal end of said embryonic passageways, said divergent portion extending between said convergent portion and the periphery of said article and making a junction with the other terminal end of said embryonic passageways.

6. As an article of manufacture, a blank comprising a sheet-like article including internally between opposed surfaces thereof a relatively thin stratum of separation material in the form of a pattern including inflatable embryonic passageways having two adjacent spaced terminal ends and an embryonic fluid passageway adapted for forming an inlet-outlet connection for said passageways, said passageway having a first portion making two spaced junctions between and with said terminal ends and a second portion forming an extension of the first said portion, said first portion between said junctions including a narrowed portion forming a constriction between said junctions with said constriction being narrower than said second portion.

References Cited in the file of this patent

UNITED STATES PATENTS

| | | |
|---|---|---|
| 2,690,002 | Grenell | Sept. 28, 1954 |
| 2,760,346 | Grenell | Aug. 28, 1956 |
| 2,772,180 | Neel | Nov. 27, 1956 |
| 2,776,552 | Thomas | Jan. 8, 1957 |
| 2,822,151 | Heuer | Feb. 4, 1958 |